Feb. 15, 1955   R. E. J. NORDQUIST   2,702,120
DISCHARGE DEVICE FOR ARTICLE WEIGHING AND SORTING MACHINES
Filed May 9, 1951   3 Sheets-Sheet 1

INVENTOR.
RONALD E. J. NORDQUIST
BY
ATTORNEYS

INVENTOR.
RONALD E. J. NORDQUIST
BY
ATTORNEYS

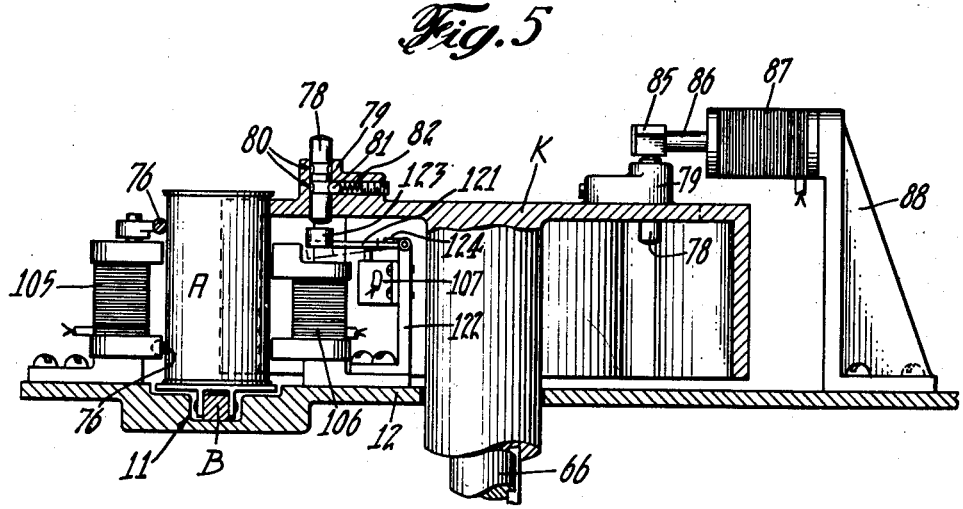
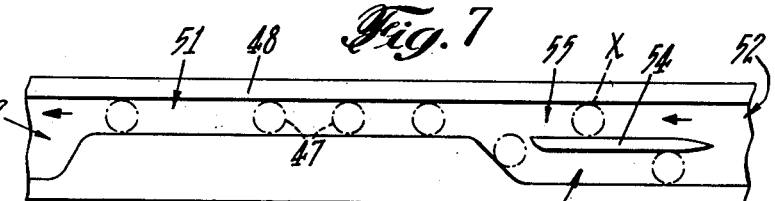
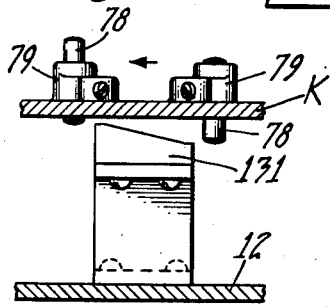
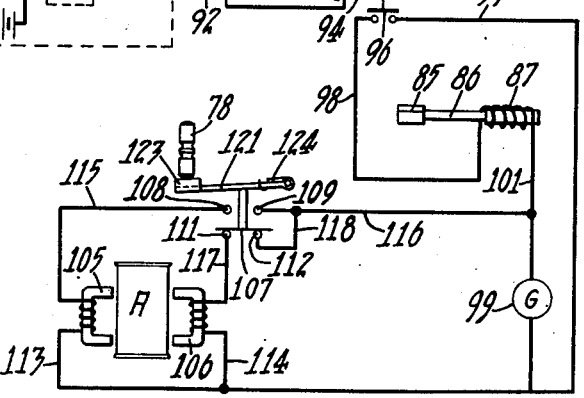
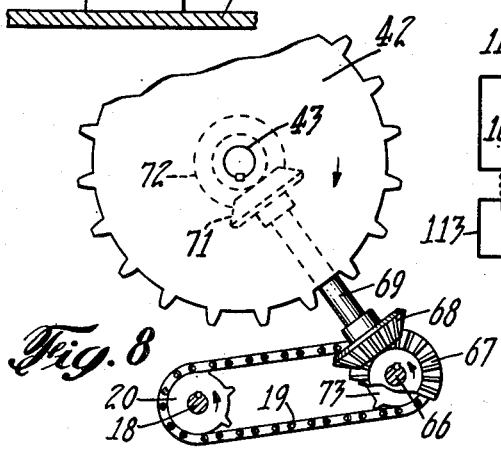
INVENTOR.
RONALD E. J. NORDQUIST
ATTORNEYS

United States Patent Office 2,702,120
Patented Feb. 15, 1955

2,702,120

DISCHARGE DEVICE FOR ARTICLE WEIGHING AND SORTING MACHINES

Ronald E. J. Nordquist, Maplewood, N. J., assignor to American Can Company, New York, N. Y., a corporation of New Jersey Application May 9, 1951, Serial No. 225,411

6 Claims. (Cl. 209—121)

The present invention relates to machines for weighing and sorting articles such as filled cans or containers and has particular reference to electrically controlled magnet discharge devices for separating lightweight cans from full weight cans advancing through the machine on individual moving scale pans.

An object of the invention is the provision in a can weighing and sorting machine of electric detecting devices for detecting lightweight cans from full weight cans advancing through the machine in a substantially continuous procession, wherein the detection of the lightweight cans is effected while the cans are individually supported on movable scale pans arranged in spaced order so that the cans may remain in an upright position.

Another object is the provision of such a machine wherein a photo-electric cell detector controls magnetic discharge devices located at the can discharge station for segregating lightweight cans from full weight cans and for directing them along different paths of travel in accordance with their weight classification.

Numerous other objects and advantages of the invention will be apparent as it is better understood from the following description, which, taken in connection with the accompanying drawings, discloses a preferred embodiment thereof.

Referring to the drawings:

Fig. 5 is an enlarged sectional view taken substantially along the broken line 5—5 in Fig. 1, with parts broken away;

Fig. 6 is an elevational detail of certain of the parts used in the mechanism shown in Fig. 5;

Fig. 7 is a fragmentary front elevation of a portion of the cam track shown at the left in Figs. 2 and 3;

Fig. 8 is a top plan view showing the manner of driving various parts of the machine, with parts broken away, the view being drawn at a reduced scale; and Fig. 9 is a wiring diagram of the electric apparatus used in the machine.

Figure 1:
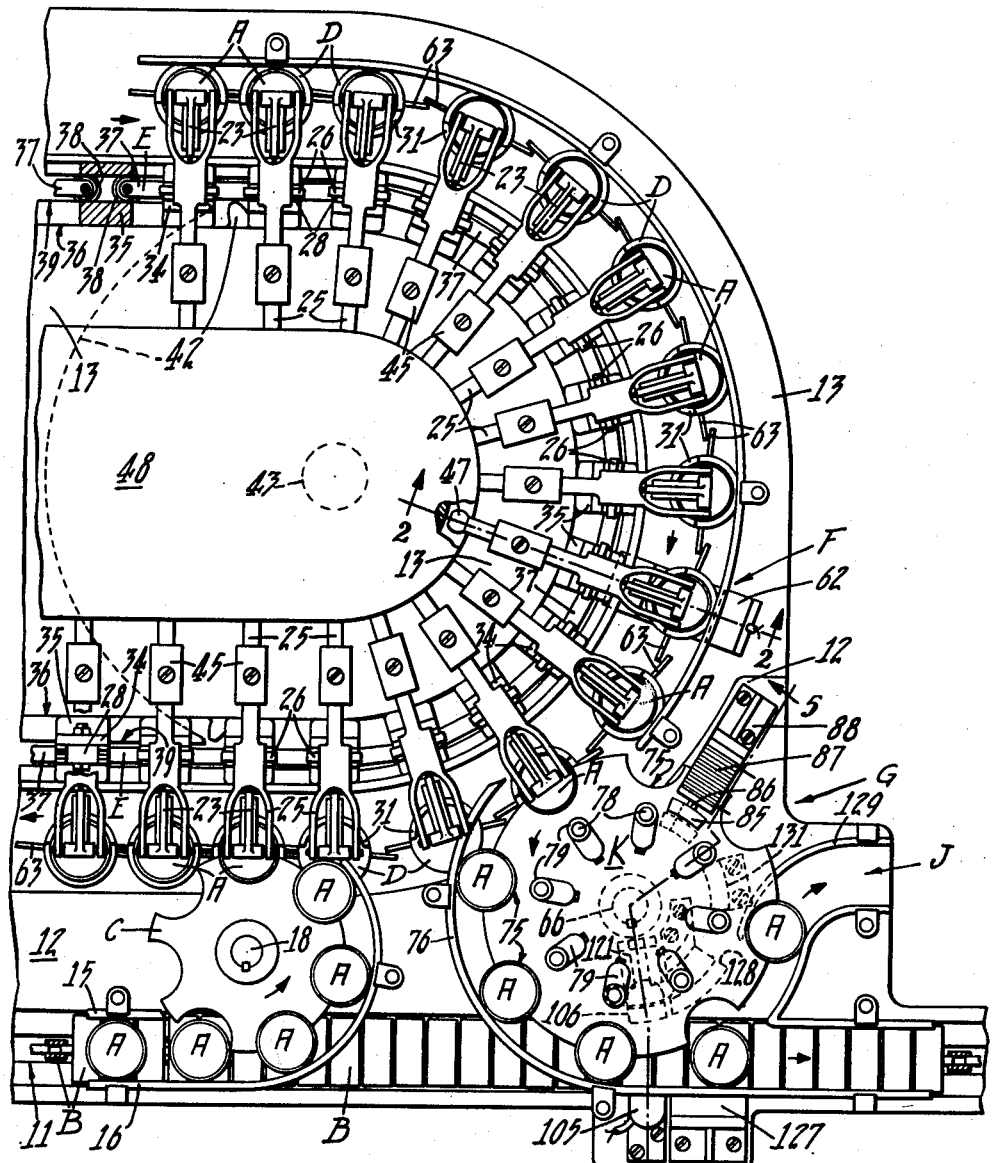
Figure 1 is a fragmentary top plan view of a machine embodying the instant invention.

As a preferred or exemplary embodiment of the instant invention the drawings illustrate principal parts of a can weighing and sorting machine of the character disclosed in United States Patents 2,098,260, issued November 9, 1937, to W. R. Smith and 2,266,807, issued December 23, 1941, to W. E. Rooney. In such a machine filled cans A (Fig. 1) enter in a continuous procession on a conveyor B and are picked off individually in spaced and timed order by a star wheel C and transferred to scale pans D propelled along an oblong endless path of travel by a weighing conveyor E. As a scale pan D moves past the feed-in star wheel C, the pan is held rigid to receive the can and is thereafter released to float vertically in accordance with the weight of the received can, as the scale pan advances along its oblong path of travel.

If the can is of full weight the can and its scale pan settles to a predetermined level and remains there. If the can is underweight, the can and its scale pan rises to a level above the full weight can level in accordance with the lightness of the can. This seeking by the can of its weight level is a slow operation and is effected while the scale pan moves along the major portion of its path of travel.

As the weighed cans approach the discharge end of the machine, the lightweight cans are detected for subsequent separation from the full weight cans when the cans are discharged. For this purpose, each scale pan D is locked against vertical movement at one of two levels, the full weight can lower level or the lightweight can higher level. While at this locked level the cans pass through a detecting station F (Fig. 1) for the lightweight can detection. After passing through this detecting station F, all of the scale pans are raised to a common level for discharge from the machine at a discharge station G.

The discharge station G includes an indexing mechanism which is controlled by devices located at the detecting station F and which receives all the cans from the scale pans D and in accordance with the full or lightweight condition of the cans, sets into operation magnetic discharge devices which separate the lightweight cans from the full weight cans and directs them into separate discharge paths of travel. The lightweight cans are directed into a lightweight discharge chute J, while the full weight cans are returned to the conveyor B for discharge to any suitable place of deposit. It is to this detection and separation of the cans and their discharge into proper paths of travel that the invention is particularly directed.

Referring now to the drawings in more detail, it will be observed that the conveyor B operates in a groove 11 (Figs. 1 and 5) formed in the top of a horizontal table 12 provided on a frame 13 which constitutes the main frame of the machine. The conveyor extends the full length of the machine, passing through the can feed-in and discharge portions of the machine and is actuated continuously by suitable sprockets housed in the frame 13 as disclosed in the above mentioned Smith Patent 2,098,260. Guide rails 15, 16 disposed adjacent the conveyor B keep the advancing cans in line.

The can feed-in star wheel C is disposed adjacent the conveyor B at the terminal ends of the guide rails 15, 16 and is carried on the upper end of a vertical drive shaft 18 journaled in suitable bearings formed in the main frame 13 as shown in the Smith patent. The shaft preferably is driven by an endless chain 19 (Fig. 8) which operates over a sprocket 20 secured to the lower end of the shaft and which is driven from and in time with a discharge turret K (Fig. 1) located at the discharge station G as will be hereinafter more fully explained.

The scale pans D which receive the cans A from the star wheel C, are parts of traveling scale units mounted on parallelogram systems of arms which permit of substantially vertical movement of the scale pans and the cans carried thereon as shown in the Rooney Patent 2,266,807 above mentioned. For this purpose, each scale pan D extends outwardly in a substantially horizontal position, from an upright arm 23 (Figs. 2 and 3) which at its upper end curves outwardly and terminates above the center of the scale pan D in spaced relation thereto to permit of the reception of a can A on the pan.

Figure 2:
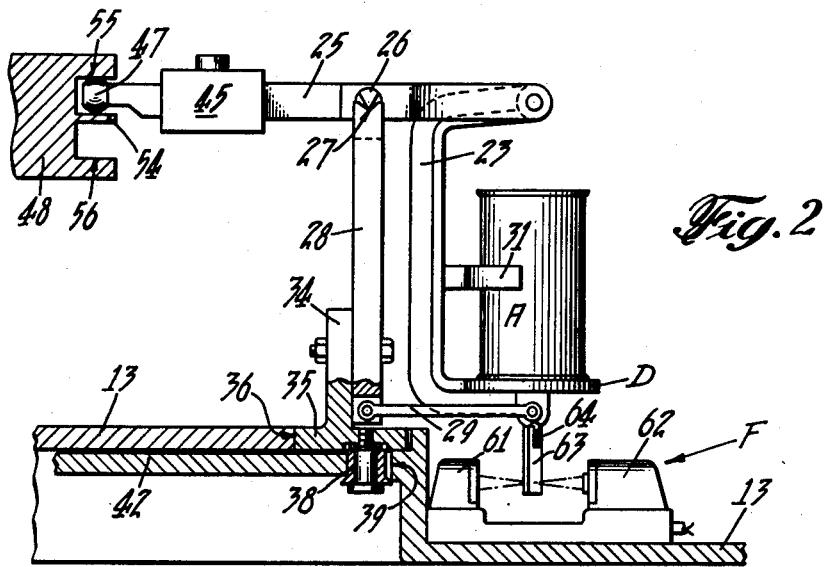
Figs. 2 and 3 are enlarged sectional views taken substantially along the line 2—2 in Fig. 1, with parts broken away, the two views showing certain of the parts in different positions.
Figure 3:
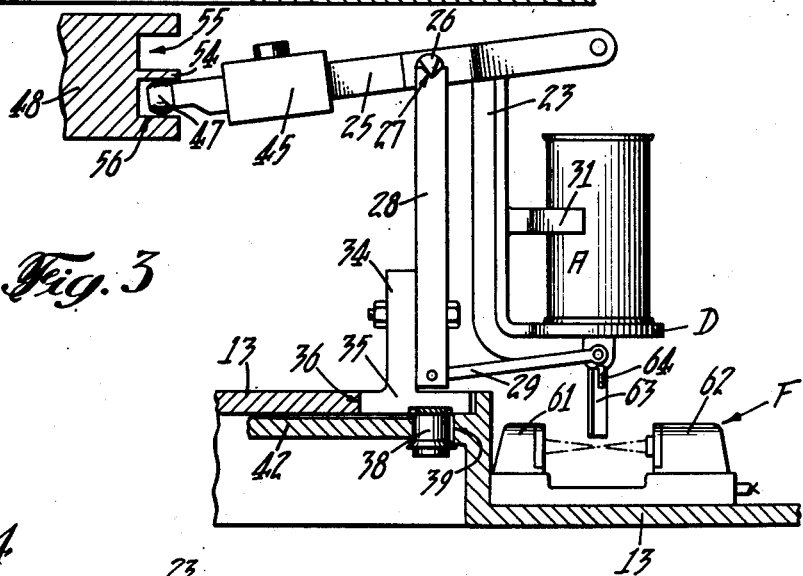

The upper terminal end of the vertical arm 23 is pivotally connected to the outer bifurcated end of a substantially horizontal balance beam 25 (Figs. 1, 2 and 3). Intermediate its ends the balance beam is provided with trunnions 26 having antifriction knife edges which rest in V-shaped seats 27 in the upper ends of an upright bifurcated support bracket 28. Adjacent the lower end of the bracket, the scale pan D is pivotally connected thereto by a link 29, the ends of which are pivotally connected to the bracket and to the pan as best shown in Figs. 2 and 3. This link completes the parallelogram system which supports and controls the movement of the scale pan. A fixed cradle 31 secured to the arm 23 extends outwardly over the scale pan D and holds a can in place on the pan.

There is one support bracket 28 for each scale pan D and these brackets adjacent their lower ends are secured to upright lugs 34 which extend up from spaced slide blocks 35 which slide in a horizontal groove 36 formed in the top of the table 12. The blocks 35 are pivotally connected by links 37 (see also Fig. 1) and taken together constitute the weighing conveyor E, details of which are disclosed in the above mentioned Smith and Rooney patents.

Actuating and guide rollers 38 depending from the slide blocks 35 operate in a guiding slot 39 in the frame 13 and at the ends of the machine operate over a conveyor driving sprocket 42 (see also Fig. 8) and an idler sprocket at the opposite end not shown. The driving sprocket 42 is mounted on a vertical shaft 43 journaled in the main frame 13 and rotated in any suitable manner, preferably as disclosed in the above mentioned Smith and Rooney patents.

Each balance beam 25 intermediate its inner end and its balancing trunnions 26, carries an adjustable counter-balance weight 45 to counterbalance the weight of the scale pan D and its supporting arm 23 and link 29. The inner end of the beam carries a cam roller 47 which operates in a track of a stationary cam 48 (Figs. 1, 2, 3 and 7) secured to the main frame 13 and disposed inwardly of and adjacent the path of travel of the weighing conveyor E. As best shown in Fig. 7, the cam 48 is formed with a narrow track section 51 disposed adjacent the top of the cam and located in the cam directly opposite the feed-in star wheel C. This section 51 of the cam track is just wide enough to confine the cam roller 47 of a scale pan D at an elevation which holds the scale pan flush with the top of the table 12 as the scale pan passes the star wheel C to permit transfer of a can A from the table to the scale pan.

Beyond the star wheel C to the left of Figs. 1 and 7, the narrow cam track section 51 merges into a considerably wider track section 52 which extends annularly around the cam 48 for the major portion thereof. This wide cam track section 52 is of sufficient width to permit the cam roller 47 to float vertically in accordance with the weight of the can received on the scale pan and to come to rest before it reaches the detecting station F.

If the can A is a full weight can, the balance beam 25 will assume a position such as shown in Fig. 2 and its cam roller 47 will ride adjacent the upper edge of the wide cam track section 52 as indicated by the roller X, shown in dotted lines in Fig. 7. If the can A is a lightweight can, the balance beam 25 will rock in a counterclockwise direction as viewed in Fig. 3, and permit the cam roller 47 to assume a position near the lower edge of the wide track section 52 or a position somewhere between the upper or lower edges depending upon the lightness of the can.

As a scale pan D with its can A approaches the detecting station F, the balance beam cam roller 47 is locked in one of two positions by engagement with a locking projection or divider rail 54 (Fig. 7) which extends out from the cam in the track section 52 midway between its upper and lower edges. This projection divides the wide track section 52 into two narrow track sections 55, 56 respectively disposed adjacent the upper and lower edges of the track section 52. These sections 55, 56 are just wide enough to confine the cam roller 47 against vertical displacement while passing through the detecting station F. The leading edge of the projection 54 is tapered so as to direct the cam roller 47 into one or the other of the locking sections 55, 56 in accordance with the degree of lightness of the can.

For a full weight can, or one within the allowable degree of lightness, the cam roller 47 will be directed into the upper locking section 55 and through its balance beam 25, will hold the scale pan D and its can A in a position as shown in Fig. 2. For a lightweight can, beyond the allowable limit, the cam roller 47 will be directed into the lower locking section 56 and through its balance beam 25, will hold the scale pan D and its can A in an elevated position, as shown in Fig. 3.

When a can A in the above mentioned lightweight position moves through the detecting station F it is immediately detected for separation from the full weight cans at the discharge station G. This detection of lightweight cans is brought about by a photo-electric cell device which includes a source of light such as a lamp 61 (Figs. 2, 3 and 9) which directs a beam of light towards a photo-electric cell 62 disposed in spaced relation thereto. The lamp 61 and the cell 62 are mounted on the frame 13 and located below the path of travel of the scale pans D with the beam of light extending radially and across the vertically projected path of travel of the scale pans. This beam of light under normal conditions, i. e. when full weight cans are passing through the detecting station, is broken or blocked off from entering the photo-electric cell 62 by a vertically disposed shield or vane 63 which is located under each scale pan D and is secured to a depending stem 64 of the vertical arm 23 (see Figs. 2, 3, and 4). There is one shield 63 for each scale pan D and they preferably are rectangular in shape and extend laterally on each side of the stem 64 to overlap the adjacent shields carried on adjacent scale pans. The shields are disposed at a slight angle to each other as best shown in Fig. 1 to permit of this overlapping arrangement.

Figure 4:
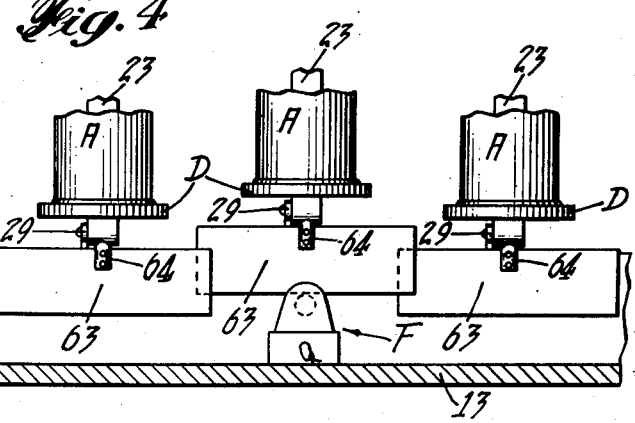
Fig. 4 is a fragmentary front elevation of the parts shown in Figs. 2 and 3.

Hence as long as full weight cans A are passing through the detecting station F, the lowered position of the scale pans D causes the overlapping shields 63 to pass between the lamp 61 and the photo-electric cell 62 as shown in Fig. 2 and thus provides a continuous blocking off of the light beam from the lamp 61. However, when a lightweight can A passes through the detecting station, the higher position of its scale pan D holds its shield 63 above the light beam from the lamp as shown in Figs. 3 and 4 and thus permits the light beam to enter the photo-electric cell 62 to effect detection of the lightweight can for its subsequent discharge from the machine as will now be explained.

After passing through the detecting station F, all cans, lightweight and full weight are brought to a common level by the entering of the cam rollers 47 of all the scale pans D into the upper track section 51 of the track 48. This action locks the scale pans D against vertical displacement for the discharge of the cans from the scale pans. While the scale pans are in this locked position the cans are removed by the discharge turret K located adjacent the path of travel of the scale pans at the discharge station G.

The discharge turret K is located between the weighing conveyor E and the conveyor B and is mounted in a horizontal position on the upper end of a vertical shaft 66 (Figs. 1 and 8) journaled in bearings formed in the machine frame 13. Adjacent its lower end the shaft 66 carries a bevel gear 67 (Fig. 8) which meshes with a bevel gear 68 carried on the outer end of a cross shaft 69 journaled in the machine frame. The inner end of the cross shaft 69 carries a bevel gear 71 which meshes with a bevel gear 72 mounted on the sprocket drive shaft 43.

Through this gear connection, the discharge turret K is driven in time with the weighing conveyor E as hereinbefore mentioned. In a similar manner the actuating chain 19 of the feed-in star wheel C is driven by a sprocket 73 (Fig. 8) carried on the discharge turret drive shaft 66 and thus the star wheel C is driven in time with the conveyor E and the turret K. Hence as the discharge turret K rotates, can pockets 75 formed in the periphery of the turret, align with the scale pans D and transfer the cans from the scale pans, along a curved path of travel, toward the conveyor B. A curved guide rail 76 disposed adjacent the outer periphery of the turret K retains the cans in their turret pockets during this transfer.

Lightweight cans received in the discharge turret K are indexed for separation from the full weight cans by an indexing or time delay device which includes a plurality of vertically disposed indexing pins 78 (Figs. 1 and 5) which are carried in bosses 79 formed in the turret and which are arranged in a circle with one pin adjacent each pocket 75 of the turret. Each indexing pin 78 projects from both sides of the turret and is provided with a pair of annular grooves 80 for the reception of a locking ball 81 backed up by a spring 82 disposed in the bosses 79. Through this locking ball, the pins are held in a raised or depressed position in accordance with the weight condition of the cans as will be explained hereinafter.

Depression of an indexing pin 78 as the turret K rotates is effected by a horizontally movable cam block 85 carried on the outer end of a horizontally disposed rod 86 which constitutes a movable core for a normally de-energized electric solenoid 87 mounted on a bracket 88 secured to the machine table 12. The cam block 85 normally is disposed out of the circular path of travel of the indexing pins 78 being withdrawn from the path as shown in full lines in Fig. 1. However when the solenoid 87 is energized, as by the detection of a lightweight can through the light beam of the lamp 61 entering the photo-electric cell 62, the cam block 85 is projected into the path of travel of the indexing pins 78 for as long as the light beam is permitted to enter the photo-electric cell, and thus depresses the indexing pin 78 (as shown in Fig. 5) adjacent the turret pocket 75 which will remove the lightweight can from its scale pan D.

This energizing of the solenoid 87 by the lightweight can is brought about by electrical connection with the photo-electric cell 62. For this purpose the cell 62 is connected by wires 91, 92 (Fig. 9) to an amplifier which amplifies the current from the cell 62 sufficiently to operate a relay. The amplifier in turn is connected by wires 93, 94 to a solenoid 95 of a normally open relay 96. The relay 96 when closed by light entering the cell 62, makes contact with terminals of a pair of wires 97, 98. Wire 97 connects with a source of electric current such as a generator 99. Wire 98 connects with one end of the cam block solenoid 87. The other end of the solenoid is connected by a wire 101 to the generator 99.

Hence when the relay 96 is closed, the circuit through the solenoid 87 is complete and the solenoid is energized and one or more of the indexing pins 78 are depressed, depending whether one or more lightweight cans follow in succession. When the relay is open, as when full weight cans are passing the photo-electric cell 62, the circuit is broken and the indexing pins 78 remain undepressed.

When an indexing pin 78 is depressed for a lightweight can as described above, the can is received in the turret pocket 75 adjacent the depressed pin and the turret carries the can toward the conveyor B at the discharge station. At this discharge station an electro-magnet 105 (Figs. 1, 5 and 9) called a full weight can magnet is disposed adjacent the outer edge of the conveyor B and a similar electro-magnet 106, called a lightweight can magnet is disposed adjacent the inner edge of the conveyor. These magnets are located so that all cans carried by the discharge turret K are advanced between the magnets.

Energizing and de-energizing of the two magnets 105, 106 is controlled by a double switch 107 (Fig. 9) having contacts 108, 109 and 111, 112. For this purpose one side of each of the magnets 105, 106 is connected by respective wires 113, 114 to the generator 99. The other side of the magnet 105 is connected by a wire 115 to the contact 108 of the switch 107 while the co-operating contact 109 of the switch is connected by a wire 116 to the generator. In a similar manner the other side of the magnet 106 is connected by a wire 117 to the contact 111 of the switch 107 and its opposite contact 112 is connected by a wire 118 to the wire 116 leading to the generator. The switch 107 is operated by a spring controlled lever 121 pivoted on a bracket 122 (see Fig. 5) secured to the table 12. The free end of the lever is formed with a boss 123 which is disposed immediately below the path of travel of the lower ends of the indexing pins 78 as best shown in Fig. 5. A spring 124 normally keeps the lever 121 in a raised position and thus keeps the switch 107 closed against its upper contacts 108, 109 and the boss 123 just out of reach of the lower ends of any undepressed indexing pins 78.

With the switch closed against the upper contacts 108, 109, the outer or full weight can magnet 105 is energized and the opposite magnet 106 is de-energized. Thus as full weight cans, indicated by undepressed indexing pins 78 are conveyed between the magnets 105, 106, the energized magnet 105 attracts the cans and thus withdraws them from their turret pockets 75 of the discharge turret K and holds them on the conveyor B for discharge to any suitable place of deposit for full weight cans. A permanent magnet 127 (Fig. 1) disposed adjacent the electro-magnet 105 is provided to prolong the attraction of the full weight can as it travels with the conveyor B to insure its full clearance of the discharge turret K.

When a lightweight can approaches the magnets 105, 106, its depressed indexing pin 78 engages the boss 123 on the switch lever 121 and this rocks the lever downwardly and thus shifts the switch 107 from its contacts 108, 109 against its contacts 111, 112. This de-energizes the full weight can magnet 105 and energizes the lightweight can magnet 106. Thus the newly energized magnet 106 attracts the lightweight can and holds it in its turret pocket 75 of the discharge turret K until the can crosses and is beyond the full weight discharge conveyor B. A permanent magnet 128 disposed adjacent the electro-magnet co-operates with the magnet 106 in prolonging the attraction on the can to insure its full clearance of the conveyor B. Beyond the conveyor B, the lightweight can is discharged into the lightweight can chute J for discharge to any suitable place of deposit. A curved guide rail 129 projecting under the discharge turret K removes the lightweight can from its turret pocket 75 and directs it into the chute J.

As soon as a lightweight can passes the magnets 106, 128, its depressed indexing pin 78 is returned to its normal raised position by engaging against an inclined cam 131 disposed under the turret K in the path of travel of the indexing pins. Thus the pin is ready for a subsequent indexing operation as it approaches the solenoid actuated cam block 85.

In this manner lightweight cans A are detected as they pass through a beam of light and their detection sets in motion an indexing device which energizes and deenergizes co-operating electro-magnets which segregate the lightweight cans from the full weight cans in an orderly and highly efficient and novel manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can weighing and sorting machine, the combination of a conveyor, means for moving said conveyor along a predetermined path of travel, a plurality of scale units carried by said conveyor and having free vertical movement to assume relative vertical positions at different levels according to the weights of cans received thereon, a lightweight can detector device including a photo-electric cell and a source of light disposed adjacent said path of travel and projecting a light beam into said cell, a shield carried on each of said scale units, the shield on one unit overlapping the shield on an adjacent unit to provide a continuous light barrier, said shields being movable by said units between said cell and said source of light for blocking off said light beam when a unit carries a can of one weight and for clearing said light beam to excite said photo-electric cell when a unit carries a can of another weight, and magnetic means responsive to said photo-electric cell for attracting and segregating said lightweight cans from said full weight cans, said magnetic means comprising a pair of electro-magnets electrically connected and selectively responsive to said detector device to thus segregate all full and light weight cans advanced between said magnets by said conveyor.

2. In a can weighing and sorting machine, the combination of an endless conveyor, means for moving said conveyor along a predetermined path of travel, a plurality of scale units carried by said conveyor and having free vertical movement to assume relative vertical positions at different levels according to the weights of cans received thereon, a lightweight can detector device disposed adjacent the path of travel of said scale units for detecting a lightweight can passing said detector device, a discharge device disposed adjacent the path of travel of said scale units beyond said detector device for receiving the cans from said units, and a pair of electro-magnets disposed on opposite sides of the path of travel therebetween of the cans in said discharge device, said magnets being electrically connected and selectively responsive to said detector device, said magnets being respectively energized and de-energized by said detector device in accordance with the weight of a can passing through said detector device for attracting and directing said can into a light or full weight discharge exit.

3. In a can weighing and sorting machine, the combination of an endless conveyor, means for moving said conveyor along a predetermined path of travel, a plurality of scale units carried by said conveyor and having free vertical movement to assume relative vertical positions at different levels according to the weights of cans received thereon, a lightweight can detector device disposed adjacent the path of travel of said scale units for detecting a lightweight can passing said detector device, a movable can discharge device disposed adjacent the path of travel of said scale units beyond said detector device for receiving all cans from said units, a pair of electro-magnets disposed on opposite sides of the path of travel therebetween of the cans in said discharge device, said magnets being electrically connected and selectively responsive to said detector device, one of said magnets being energized and the other de-energized by said detector device in accordance with the weight of a can passing through said detector device for attracting and directing said can into a lightweight or full weight discharge exit, and an auxiliary magnet disposed adjacent each of said electromagnets and co-operating with said electro-magnets when the latter are energized to prolong the magnetic attraction of the energized magnet on the moving can to insure directing of the can into the proper discharge exit.

4. In a can weighing and sorting machine, the combination of an endless conveyor, means for moving said conveyor along a predetermined path of travel, a plurality of scale units carried by said conveyor and having free vertical movement to assume relative vertical positions at different levels according to the weights of cans received thereon, a lightweight can detector device disposed adjacent the path of travel of said scale units for detecting a lightweight can passing said detector device, a movable can discharge device disposed adjacent the path of travel of said scale units beyond said detector device for receiving all cans from said units, and a pair of electro-magnets disposed on opposite sides of the path of travel of the cans moved therebetween by said discharge device, said magnets being selectively responsive to the action of said detector device, one of said magnets being energized and the other de-energized by said detector device when a full weight can passes through said detector device for attracting and diverting said full weight can into one discharge path, the other of said magnets being energized and the first mentioned magnet de-energized by said detector device when a lightweight can is detected for attracting and diverting said lightweight can into another discharge path to segregate said lightweight cans from said full weight cans.

5. In a can weighing and sorting machine the combination of an endless conveyor, means for moving said conveyor along a predetermined path of travel, a plurality of scale units carried by said conveyor and having free vertical movement to assume relative vertical positions at different levels according to the weights of cans received thereon, a lightweight can detector device including a photo-electric cell disposed adjacent the path of travel of said scale units for detecting a lightweight can passing said detector device, a rotary discharge turret having peripheral pockets disposed adjacent the path of travel of said scale units beyond said detector device for receiving the cans from said units, means for rotating said turret in time with said conveyor, a time delay device carried by said turret, means connected with said detector device for setting said time delay device when a lightweight can is detected to indicate the pocket of said turret in which the detected can is received, a full weight can discharge conveyor disposed adjacent said discharge turret, a lightweight can chute disposed adjacent said turret remotely from said discharge conveyor, a pair of electro-magnets disposed one on each side of the path of travel of the cans in said turret and at said discharge conveyor, and electric means connected to said magnets and maintaining one of said magnets energized for attracting and removing from said turret pockets full weight cans for delivery onto said full weight can discharge conveyor, said electric means being engageable by said time delay device for temporarily de-energizing said energized magnet and for energizing the other of said magnets to attract and retain in said turret pockets lightweight cans for delivery into said lightweight can discharge chute.

6. In a can weighing and sorting machine, the combination of an endless conveyor, means for moving said conveyor along a predetermined path of travel, a plurality of scale units carried by said conveyor and having free vertical movement to assume relative vertical positions at different levels according to the weights of cans received thereon, a lightweight can detector device comprising a photo-electric cell disposed adjacent the path of travel of said scale units for detecting a lightweight can passing said detector device, a discharge device disposed adjacent the path of travel of said scale units beyond said detector device for receiving the cans from said units, a time delay device responsive to the action of said detector device for indicating a detected can in said discharge device, a pair of discharge electro-magnets spaced one on each side of the path of travel of the cans in said discharge device, and an electric switch disposed adjacent and operable by said time delay device, said switch having a double set of contacts, one set of contacts being connected to one of said magnets and the other set of contacts being connected to the other magnet, said switch being normally closed against one set of contacts for energizing one of said magnets and de-energizing the other of said magnets and being closed against the other set of contacts by said time delay device for de-energizing said first mentioned magnet and energizing the other magnet for discharging said cans in accordance with their weight along a lightweight or a full weight discharge exit.

References Cited in the file of this patent

UNITED STATES PATENTS

| Number | Name | Date |
|---|---|---|
| 2,098,260 | Smith | Nov. 9, 1937 |
| 2,158,023 | Smith | May 9, 1939 |
| 2,176,784 | Bowden | Oct. 17, 1939 |
| 2,235,725 | Nordquist | Mar. 18, 1941 |
| 2,266,807 | Rooney | Dec. 23, 1941 |
| 2,400,507 | Henszey | May 21, 1946 |
| 2,627,346 | Stone | Feb. 3, 1953 |
| 2,627,348 | Stone | Feb. 3, 1953 |